United States Patent [19]

Eikill et al.

[11] Patent Number: 5,339,397
[45] Date of Patent: Aug. 16, 1994

[54] HARDWARE PRIMARY DIRECTORY LOCK

[75] Inventors: Richard G. Eikill; Sheldon B. Levenstein; Lynn A. McMahon, all of Rochester; Joseph P. Weigel, Oronoco, all of Minn.

[73] Assignee: International Business Machines Corporation, Armonk, N.Y.

[21] Appl. No.: 596,812

[22] Filed: Oct. 12, 1990

[51] Int. Cl.$^5$ .................. G06F 12/10; G06F 12/14; G06F 13/00; G06F 13/376
[52] U.S. Cl. .................. 395/400; 395/425; 395/325; 364/DIG. 1; 364/DIG. 2; 364/228; 364/242.6; 364/243.41; 364/256.4
[58] Field of Search .................. 395/400, 425, 325

[56] References Cited

U.S. PATENT DOCUMENTS

| | | | |
|---|---|---|---|
| 4,400,770 | 4/1983 | Chan et al. | 395/425 |
| 4,415,972 | 11/1983 | Adcock | 395/325 |
| 4,513,367 | 4/1985 | Chan et al. | 395/425 |
| 4,709,326 | 11/1987 | Robinson | 395/725 |
| 4,775,955 | 10/1988 | Liu | 395/425 |
| 4,802,164 | 1/1989 | Fukuoka et al. | 395/575 |
| 4,843,542 | 6/1989 | Dashiell et al. | 395/400 |
| 4,928,225 | 5/1990 | McCarthy et al. | 395/425 |
| 4,939,641 | 7/1990 | Schwartz et al. | 395/425 |
| 4,975,833 | 12/1990 | Jinzaki | 395/425 |
| 4,977,498 | 12/1990 | Rastegar et al. | 395/425 |
| 5,010,475 | 4/1991 | Hazawa | 395/400 |
| 5,029,070 | 7/1991 | McCarthy et al. | 395/400 |
| 5,055,999 | 10/1991 | Frank et al. | 395/425 |
| 5,113,510 | 5/1992 | Hillis | 395/425 |
| 5,131,085 | 7/1992 | Eikill | 395/325 |
| 5,155,834 | 10/1992 | Ryan et al. | 395/425 |
| 5,161,227 | 11/1992 | Dias et al. | 395/650 |
| 5,168,560 | 12/1992 | Robinson et al. | 395/425 |
| 5,175,837 | 12/1992 | Arnold et al. | 395/425 |

FOREIGN PATENT DOCUMENTS

| | | |
|---|---|---|
| 0142820 | 5/1985 | European Pat. Off. |
| 55-6633 | 1/1980 | Japan . |
| 61-42054 | 2/1986 | Japan . |
| 62-282345 | 8/1987 | Japan . |
| 62-298866 | 12/1987 | Japan . |

OTHER PUBLICATIONS

IBM Technical Disclosure Bulletin, vol. 27, No. 8, Jan. 1985, "Cross–Boundary Storage Micro Word Lockout Mechanism For a Dual Stream Processor System", M. J. Champion and E. W. Jackson, Jr., pp. 4758–4759.
"Translation Lookaside Buffer Consistency: A Software Approach", David L. Black et al, pp. 113–122, Proc. 3rd Int. Conf. On Architectural Support . . . Apr. 1989, NY.
Operating Systems Review (SIGOPS), vol. 23, No. 5, 1989, New York US, pp. 137–146, XP115494, Bryan S. Rosenburg, "Low–synchronisation translation lookaside buffer consistency in large-scale shared memory multiprocessors".
"The Cost of TLB Consistency", P. J. Keller, pp. 1–14, Cache & Interconnect Architectures in Multiprocessors, May 25, 1989, Kluwer Academic Publishers, Boston.

Primary Examiner—Joseph L. Dixon
Assistant Examiner—Michael A. Whitfield

[57] ABSTRACT

An information processing network includes multiple processing devices, a main storage memory, one or more disk drives or other auxiliary storage devices, and an interface for coupling the processing devices to the main storage memory and the auxiliary devices. A primary directory in main storage contains mapping information for translating virtual addresses to real addresses in main storage. Look-aside buffers in the processing devices duplicate some of the mapping information. A primary directory hardware lock, subject to exclusive control by any one of the processing devices to update the primary directory, inhibits access to the primary directory based on hardware address translations initiated when one of the processors holds the primary directory lock. Address translations in progress when the lock is acquired proceed to completion before the primary directory is updated under the lock. Accordingly, such updates proceed atomically relative to hardware primary directory searches. Unnecessary quiesces and purges of the look-aside buffers are eliminated, substantially improving network performance.

14 Claims, 5 Drawing Sheets

HARDWARE PRIMARY DIRECTORY LOCK

BACKGROUND OF THE INVENTION

The present invention relates to information processing systems in which multiple processing devices are coupled to a main storage memory and to auxiliary storage devices, e.g. disk drives. More particularly, the invention relates to information in the main storage memory and in the processing devices, used to associate virtual addresses with real addresses in main storage, and to a system for maintaining the coherency of such information in main storage and in the processing devices.

Among the recent trends in data processing are computer architectures which increasingly employ multiple processing devices that share a common interface to a main storage memory and to disk drives or other auxiliary storage devices. To enhance system performance, the processing devices can be equipped to store some of the data found in main storage memory. For example, cache memories can be provided, one within and uniquely associated with each of the processing devices and containing some of the information stored in main memory. Whenever one of the processing devices performs a data store or fetch operation in its cache memory rather than in the shared main memory, memory access time is substantially reduced.

In networks incorporating auxiliary storage devices, storage locations in such devices are identified with virtual addresses. While data is in main storage, its virtual address is associated or coupled with one of the real addresses in main storage. Each real address identifies a page frame or other separately identifiable unit of data within the main storage memory. This arrangement gives rise to the need to translate address data, i.e. correctly associate a virtual address with the corresponding real address in main memory. To this end, information systems can incorporate into the main memory an index or table to associate each virtual address with one of the real addresses (i.e. one of the page frames) in the main memory. Such table, known as a "primary directory", comprises a plurality of chains of primary directory entries, each entry associated with a different real address.

It is advantageous to provide in each of the processing devices a "secondary directory" whereby some of the primary mapping information in main storage is also resident in each processing device. The secondary directories provide fast lookup tables for performing address translations without the need to gain access to the primary directory. Thus, primary directory access time is substantially reduced, improving network performance. Primary directory translates or searches are initiated with hardware logic in each of the processing devices only when the respective secondary directory lacks the information necessary for the operation.

This advantage, however, depends on the ability to maintain coherency of the secondary directories and the primary directory, i.e. keeping the secondary directories current with updates to the primary directory. It is known to achieve coherency with a quiesce, generally as follows:

1. one of the processing devices is to modify the primary directory;
2. the modifying processor sends the appropriate message to the remaining processing devices;
3. the remaining processing devices receive the message and confirm to the sending processing device that they have received the message;
4. the sending processor modifies the primary directory, while the remaining processors are kept inactive;
5. the modifying processor sends a message to the remaining processors that the primary directory update is complete; and
6. the other processors respond to the message and resume normal operation.

The quiesce is time consuming but heretofore considered necessary. Without it, one processor might perform a primary directory translate while another processor is updating the primary directory. One processor might store data from a page frame into its secondary directory, while another processor is invalidating the same page in the primary directory. One processor might be updating the primary directory to indicate that the associated data has been modified, at the same time another processor resets a reference bit associated with the same data. The result would be a failure to update the corresponding data as stored on an auxiliary storage device.

Therefore, it is an object of the present invention to provide a multiprocessor network in which data translations can be temporarily inhibited during updates to a primary directory, without a quiesce.

Another object is to maintain directory coherency without unnecessary secondary directory purges in such a network by ensuring, temporarily, that no primary directory translations can occur which might raise the need for a purge.

A further object is to provide a network in which primary directory entries can be removed from the primary directory at a time when no hardware translations are in progress.

Yet another object is to provide a means of updating status bits in a primary directory atomically with respect to hardware primary directory translations.

SUMMARY OF THE INVENTION

To achieve these and other objects, there is provided a data processing network including a plurality of processing devices for executing computer program instructions to manipulate bit-encoded data. A main storage memory, having a plurality of page frames for storing bit-encoded data, is shared by the processing devices. The processing devices also share an auxiliary storage means for storing bit-encoded data. An interface, connected to the processing devices, main storage memory and to the auxiliary storage means, transmits bit-encoded data among the processing devices, main storage memory and auxiliary storage means.

The main storage memory includes a primary directory containing primary mapping information for associating real addresses of the page frames with virtual addresses of data storage locations in the auxiliary storage means.

Each of the processing devices includes a secondary directory containing secondary mapping information comprising a portion of the primary mapping information. Each processor also includes a primary directory translate means for performing translations on the secondary mapping information, and for requesting access to the primary mapping information via the interface and gaining such access to perform translations on the primary mapping data. Each processing device has a signalling means for generating a first signal when requesting the access and generating a second signal when gaining the access. A signal transmitting means provides the first and second signals to all of the processing devices.

The data processing network further includes a means for temporarily preventing any of the primary directory translate means of the processing devices from gaining access to the primary directory, including: (1) a primary directory hardware lock; (2) a control store means in at least one of the processing devices, for containing computer program instructions that include control words for acquiring the primary directory lock as a condition precedent to gaining access to the primary mapping information; and (3) a second signalling means for generating a lock-acquired signal when the at least one processing device acquires control of the primary directory lock.

The transmission means provides the lock-acquired signal to all of the processing devices, thereby preventing the primary directory translate means of any of the processing devices from gaining said access.

Preferably, all of the processing devices include control store means and are capable of acquiring control of the primary directory lock. In this event, the lock-acquired signal generated by the processing device controlling the lock also inhibits any of the other processing devices from acquiring control of the primary directory lock. The second signalling means also preferably generates a lock-released signal which, when provided to the processing devices, enables the respective primary directory translate means to gain access to the primary mapping information for primary directory translations, and enables the other processing devices to acquire control of the primary directory lock.

Each of the processing devices includes a set of hardware translate registers and lock registers. One translate register in each set corresponds to each one of the processing devices. The first and second signals correspond to first and second bit positions of the translate registers. In particular, a binary one in the first bit position of a translate register indicates that the processing device corresponding to that register is requesting access to the primary directory. A binary one in the second bit position of that register indicates the associated processing device has gained access.

Likewise, one lock register in each set corresponds to one of the processing devices. A selected bit position in each lock register, when containing a binary one, indicates that its associated processing device has acquired the primary directory lock.

Thus, each of the processing devices has two approaches to reach the primary directory: (1) acquiring control of the primary directory lock; and (2) without the lock, through its primary directory translate means. These competing approaches are serialized in the following manner.

As long as none of the processing devices controls the primary directory lock, all of the processing devices can perform translations on the primary directory through their respective translation means. Once one of the processors acquires the lock, all subsequent requests for access are denied. Access requests pending when the lock was acquired, however, are allowed to proceed to completion. With respect to such pending translations, the processor that acquired the primary directory lock is inhibited from fetching data in the primary directory until completion of the pending translations. When pending translations are complete, the processing device controlling the lock can fetch the primary mapping data, perform operations upon the data, then store the data back to the primary directory. Meanwhile, any access requests by the translation means continue to be denied.

When the processing device completes the store, it releases the primary directory lock, enabling any processor requesting access, through its translate means, to gain control of the interface for a primary directory translation.

A primary advantage of this serialization is that many unnecessary purges of secondary directory information are avoided. Primary directory data operations utilizing the lock can be performed under conditions that effectively "freeze" the condition of the primary directory and secondary directories. This guarantees that an indication at the beginning of the operation that no purge is necessary, remains true throughout the operation. Secondly, updates to the primary directory by one of the processing devices disable the remaining processing devices only with respect to operations that require access to the primary directory. The other processing devices can conduct operations not requiring such access, a condition not possible when a quiesce is employed. Accordingly, network efficiency is enhanced, while coherency of the secondary directories and the primary directory is maintained.

IN THE DRAWINGS

For a further understanding of the above and other features and advantages, reference is made to the following detailed description and to the drawings, in which.

DETAILED DESCRIPTION OF THE PREFERRED EMBODIMENT

To facilitate an understanding of the preferred embodiment, this description begins with a brief explanation of certain terms used to describe the operation and features of the invention.

IMPI instructions: assembly level computer program instructions in microcode. Processing devices execute IMPI instructions sequentially in performing logical operations on data, e.g. store, add, and move-character functions.

IMPI task (or data operation): a synchronous execution of one or more IMPI instruction streams comprising a unit of work executed or executable by a processing device. Each IMPI stream includes data used by the stream, and parameters necessary for transferring information to or from other IMPI streams.

Horizontal microcode (HMC): microcode that interprets IMPI instructions, i.e. decomposes the IMPI instructions into a series of simpler steps. HMC instructions also are called control words, and govern the state of the hardware.

Figure 1:
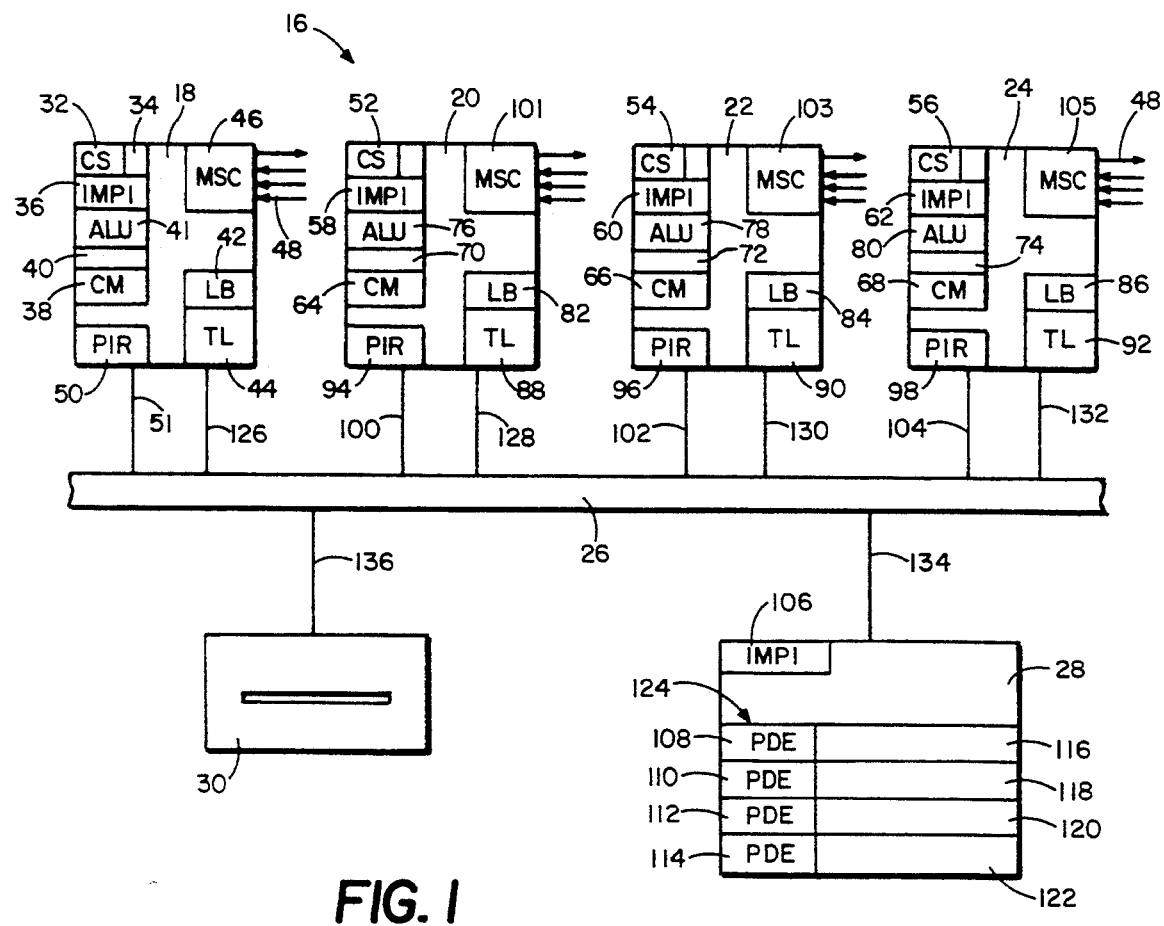
FIG. 1 is a schematic view of an information processing network with multiple processing devices sharing a main storage memory and an auxiliary storage device, each processing device having a secondary directory corresponding to a portion of a primary directory in main storage.

Turning now to the drawings, there is shown in FIG. 1 an information processing network 16 for storing and performing various operations upon bit-encoded data. The network in this example includes four processing devices at 18, 20, 22 and 24, but more or fewer processing devices could be used. A main storage interface 26 couples the processing devices to a main storage memory 28 and to an auxiliary storage device 30, e.g. a disk drive.

Processor 18 includes a control store 32 containing the horizontal microcode (HMC) and a control store output register 34. The processing device further includes an array of general purpose IMPI registers 36. When an IMPI task is switched into processor 18 for execution, data and IMPI instructions pertinent to the task are loaded into registers 36 either from main storage memory 28 or from a cache memory 38 of the processing device. When the task is switched out of processor 18, processor data is stored to the main storage memory, and also may be stored to the cache memory, if the associated cache lines are valid.

Cache memory 38 is a one-way associative store-through cache having a plurality of cache lines associated with a particular set of addresses or locations in the main storage memory. Cache memory 38 further includes a cache directory 40. The cache directory is a record of the main storage memory addresses mapped into the cache memory, and stores an indication of whether each corresponding location in the cache memory is valid or invalid. Logic for performing arithmetic operations on data is provided in the processor, as indicated at 41.

Processing device 18 includes a look-aside buffer 42, which contains a record of certain virtual addresses mapped to real addresses. Translate logic 44 (in the form of semiconductor chip circuitry) can gain access to information in look-aside buffer 42 to perform translations, i.e. associate the appropriate real address with a given virtual address. In the event the given virtual address can not be translated based on information in look-aside buffer 42, translate logic 44 can request and eventually gain access to a primary directory in the main storage memory, via interface 26.

Processing device 18 has an arbitration sector or main storage control 46. Arbitration lines at 48 interconnect arbitration sector 46 with substantially identical arbitration sectors of the other processing devices, and are used in combination with arbitration logic residing in the arbitration sectors to assign priority to any one of the processing devices in terms of (1) access to interface 26 between the processors and the main storage memory and auxiliary storing device, and (2) acquiring control of a hardware lock as is later explained. A processor intercommunications register (PIR) 50 and PIR line 51 enable processing device 18 to send messages to other processing devices, receive messages from any one of the processing devices and, upon receiving a message from another processor, provide an acknowledgement to that processor, all via interface 26.

Processing devices 20, 22 and 24 are similar to processing device 18, and include respective control stores 52, 54 and 56 and respective control store output registers such as 34; respective IMPI register arrays 58, 60 and 62; respective cache memories 64, 66 and 68; respective cache directories 70, 72 and 74; respective arithmetic logic at 76, 78 and 80; respective look-aside buffers 82, 84 and 86; respective translate logic at 88, 90 and 92; respective processor intercommunications registers at 94, 96 and 98; and respective PIR lines at 100, 102 and 104. These components function in substantially the same manner as their counterparts in processing device 18. Accordingly, each of the processing devices has the same ability to gain control of IMPI tasks, although only one of the processing devices can control a particular task at any given time.

Main storage memory 28 includes a program instruction store 106 in which the IMPI instructions are embedded. The main storage memory further includes an array of page frames for storing pages of bit-encoded data, each page being 512 data bytes. A series of primary directory entries are indicated at 108–114, one PDE corresponding to each of page frames 116–122. A primary directory 124, consisting of all PDEs, is a complete record of the virtual addresses that correspond to real addresses of the various page frames, and is the main table used in translating virtual addresses in the network. Preferably, main storage memory 28 is comprised of multiple individual memory cards, each card having its own page frames and its own program instruction segment, with the segments cooperating to provide the IMPI instructions.

Interface 26 can include a plurality of separate buses (not shown), each shared in common by all of the processing devices and memory cards of main storage. For example, working data (the information of most direct concern to the users of the network) is transmitted over a working data bus. A command/address bus transmits information controlling the transmissions of working data, including information as to the address in main storage memory 28 at which working data is to be stored or retrieved. A communications bus transmits status of the working data as the working data is transmitted via the data bus. For more detailed information about this type of interface, reference is made to U.S. Pat. No. 5,131,085 entitled "High Performance Shared Main Storage Interface", filed Dec. 4, 1989 and assigned to the assignee of the present application.

Data lines 126, 128, 130 and 132 connect processing devices 18, 20, 22 and 24 to interface 26. A data line 134 connects the interface to main storage memory 28, although in the case of multiple memory cards, each card has its own data line to the interface. A data line 136 couples disk drive 30.

Each of look-aside buffers 42, 82, 84 and 86 is a fast array including a copy of certain pages from primary directory 124 that the associated processing device is currently using. Thus, each of the look-aside buffers corresponds to the primary directory in that it contains a portion of the mapping information from the primary directory, useful for associating virtual addresses with the appropriate real addresses of the page frames. Such information in the primary directory is referred to as primary mapping information, with the same information in the look-aside buffers deemed secondary mapping information.

Figure 2:
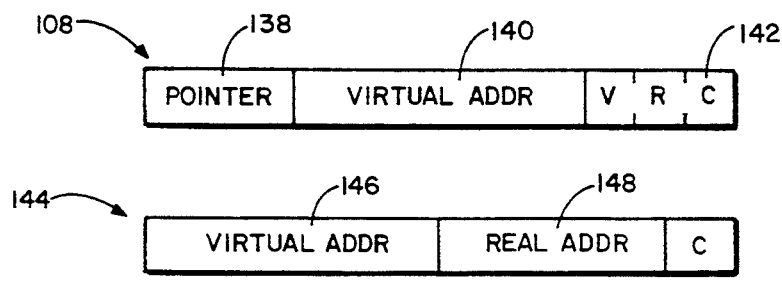
FIG. 2 is a representation of a data entry in the primary directory and a corresponding data entry in one of the secondary directories.

FIG. 2 illustrates entry 108 of the primary directory. PDE 108 includes, among other fields, a chain pointer field 138, a virtual address field 140 and a status field 142. The information in pointer field 138 is used to associate address "synonyms" in a manner that facilitates searches in primary directory 124. The virtual address field contains the virtual address associated with the particular real address, in this case the address of page frame 116. The status field includes three bit positions identified as "VALID", "REFERENCE" and "CHANGE". A corresponding secondary directory entry 144, in one of the look-aside buffers, includes the same virtual address in a field 146, information identifying the real address of page frame 116 in a field 148, and the same "CHANGE" bit position as in the primary directory entry.

Thus, VALID, REFERENCE, and CHANGE bits are associated with every page in the primary directory. A binary one in the VALID bit position (V=ON or SET) indicates that the address is in main storage memory 28. In other words, data has been written from disk drive 30 into main storage memory. A binary zero in this bit position (V=OFF or RESET) indicates that the associated page frame does not contain data, or that the associated page is being changed (currently in use).

The REFERENCE bit, when set, indicates that the associated page of data is being used, or recently has been used, by one of processing devices 18-24. A set REFERENCE bit further indicates that there may be an entry in at least one of look-aside buffers 42, 82, 84 and 86 corresponding to the primary directory entry. Consequently, any update of the primary directory 124 raises the need to purge the corresponding entries from all of the look-aside buffers. A reset REFERENCE bit indicates the associated page has not been used yet, at least not since the last time the reference bit was reset.

The CHANGE bit, when set, indicates that the corresponding data page has been changed, i.e. one of the processing devices has made a store to the corresponding page frame. This raises the need to write the data (in main storage memory) back to the disk drive, so that the page stored on the disk drive accurately corresponds to the page in main storage memory. A reset CHANGE bit indicates there is no need to write data back to the disk drive.

In addition to indicating the current status of their associated PDEs, the VALID and REFERENCE bits can be forced into the reset state to facilitate certain desired functions in network 16. For example, when it is desired to insert a page of data into one of the page frames, and the target frame is occupied by another data page, the VALID bit corresponding to the page frame is reset. The VALID bit also is reset when a page will remain in the page frame, but is being written out to disk drive 30.

Occasionally a need arises to reset REFERENCE bits. When replacing pages in the page frames is necessary, it is preferable to replace the less frequently used pages in favor of maintaining the more frequently used pages in main storage memory. One approach to favoring more frequently used pages is to remove pages in which the reference bit is reset, while retaining the pages associated with set REFERENCE bits. All or most pages, however, may be used with such frequency that an insufficient number of reference bits remain reset, and it is necessary to periodically, in cyclical fashion, force a reset condition among all REFERENCE bits.

Figure 3:
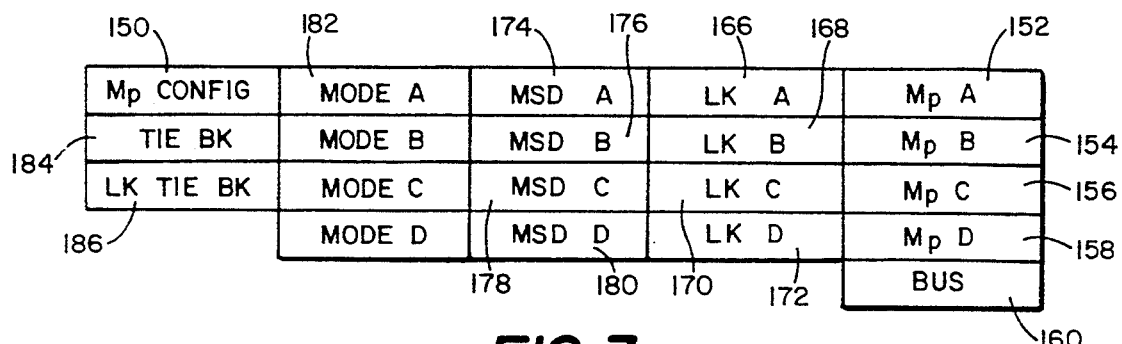
FIG. 3 is a diagrammatic view of an arbitration sector of one of the processing devices.
Figure 4:
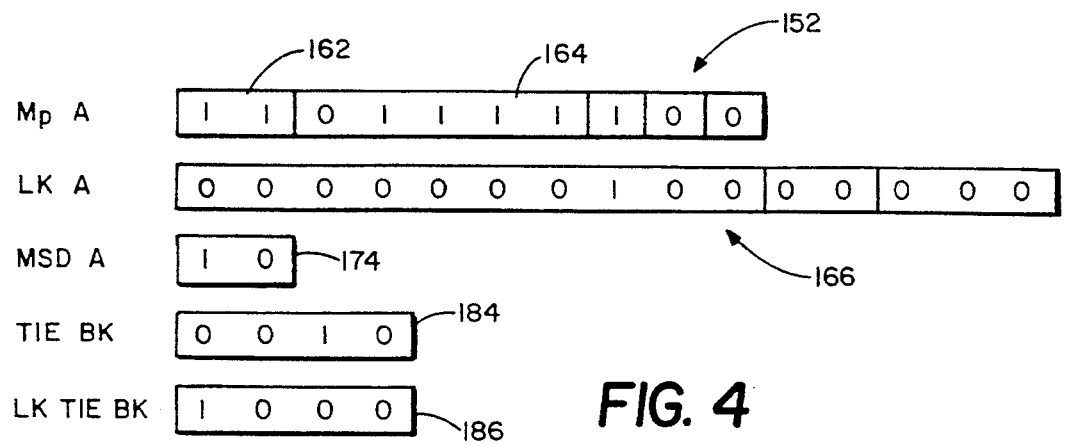
FIG. 4 is a representation of selected registers of the arbitration sector.

As seen in FIG. 3, arbitration sector 46 includes a plurality of registers for bit-encoded data, some of which are shown in greater detail in FIG. 4. Arbitration sectors 46, 101, 103 and 105 have identical registers, and logic in all four arbitration sectors is in the identical state. Thus, the main storage control (MSC) logic is duplicated in all four of the processing devices. While some discussion of the arbitration sectors and arbitration linkage is deemed appropriate here, U.S. patent application Ser. No. 07/581,843, now abandoned and continued as Ser. No. 07/962,625 entitled "Duplicated Logic and Interconnection System for Arbitration Among Multiple Information Processors", filed Sep. 13, 1990 and assigned to the assignee of the present application, is incorporated herein by reference.

Arbitration sectors 46, 101, 103 and 105 contain identical hardware registers. The logic or information contained in the registers varies from one processing device to another, since the registers contain processor-specific logic as well as general logic. A configuration register 150 contains a unique processor identification, and an indication of how many of the four processing devices are part of the network.

Arbitration sector 46 further includes four multiprocessor (Mp) registers A-D at 152, 154, 156 and 158. Each Mp register contains processor-specific information. Register 152 (Mp A) contains information specific to processing device 18, and provides the output of processing device 18 into the arbitration lines. Registers 154, 156 and 158 (Mp B-D) are each specifically related to one of processing devices 20, 22 and 24, and are inputs to processor 18 from the arbitration linkage. A bus monitor register 160 contains information as to priority among the processing devices for control of interface 26.

Considering register 152 in greater detail (FIG. 4), bit positions 0 and 1 in a field 162 indicate the current mode of operation for processing device 18. In this case a binary "11" indicates a primary directory search. Bit positions 2-6 in a field 164 identify one of ten hardware class locks and a command (ADD LOCK, CHANGE LOCK, or RELEASE LOCK) associated with the particular lock identified. In this instance, "0111" is the binary identification of lock number 7, a hardware primary directory lock. The binary one in bit position 6 indicates a command to add the primary directory lock. Bit position 7 concerns a request for interface 26, bit position 8 is available for indicating a purge of a cache memory line, and bit position 9 is for parity.

In connection with main storage memory 28, an operation appears atomic if its source operands are not allowed to change between the time that they are fetched from the main storage memory and the time that results of the operation are stored back to main memory. The stored results are then are correct for the inputs at the time of the store.

Most IMPI instructions are not atomic per se. Rather, selected IMPI instructions are atomic only relative to other instructions that operate on the same type of shared objects in main storage memory 28. IMPI operations involving such instructions are deemed "relatively atomic operations". For these operations, the inputs are not changed by another operation of the same type, from the time an operation first references an input to the time the operation stores its results. Shared objects are divided into object classes. Each class of operation is protected by one of the hardware class locks.

The primary directory hardware lock governs all requests for access to primary directory 124 that are based on HMC control words. Any one of processing devices 18–24 can acquire control of the primary directory lock. Control is exclusive in that only one of the processing devices can acquire and hold the primary directory lock at any one time. In this respect, the primary directory lock functions in the same manner as the other hardware class locks noted in the aforementioned application Ser. No. 07/581,843 now abandoned and continued as Ser. No. 07/962,625.

In accordance with the present invention, the primary directory lock also serializes primary directory searches based on HMC control words against primary directory searches initiated by the translate logic 44, 88, 90 and 92 in the processing devices.

Returning to FIG. 3, arbitration sector 46 includes four lock registers 166, 168, 170 and 172 (LK A-D), each corresponding to one of the Mp registers. Bit positions 0–9 of each lock register identify the hardware locks currently held. The binary one in bit position 7 of register 166 (FIG. 4) indicates that the primary directory hardware lock is active in (held by) processing device 18. Bit positions 10–14 concern a mode sequencer and a store-tracking sequencer, the details of which are found in the aforementioned application Ser. No. 07/581,843 now abandoned and continued as Ser. No. 07/962,625.

Arbitration sector 46 further includes four hardware translate or main storage data registers 174, 176, 178 and 180 (MSD A-D). Each of the MSD registers includes two bit positions relating to the primary directory translate logic in its associated processing device. In particular, a binary one in bit position 0 indicates that the associated processor is requesting access to interface 26 to perform an address translation in primary directory 124. A binary one in bit position 1 indicates that the associated processing device has gained access to interface 26 and thus can perform the translate. Thus, in FIG. 4 the "10" in register 174 (MSD A) indicates that processing device 18 is requesting access to interface 26 to perform a primary directory translate, but has not yet gained such access. Four mode registers are indicated at 182.

Finally, the arbitration sector includes an interface tie break register 184 and a lock tie break register 186. Each of these registers, depending upon the bit position of a binary one, indicates the priority of processing device 18, register 184 as to bus arbitration for control of interface 26, and register 186 as to acquiring one of the hardware class locks. Priority assignments are dynamic, i.e. changing with each event of interface arbitration or lock arbitration.

Figure 5:
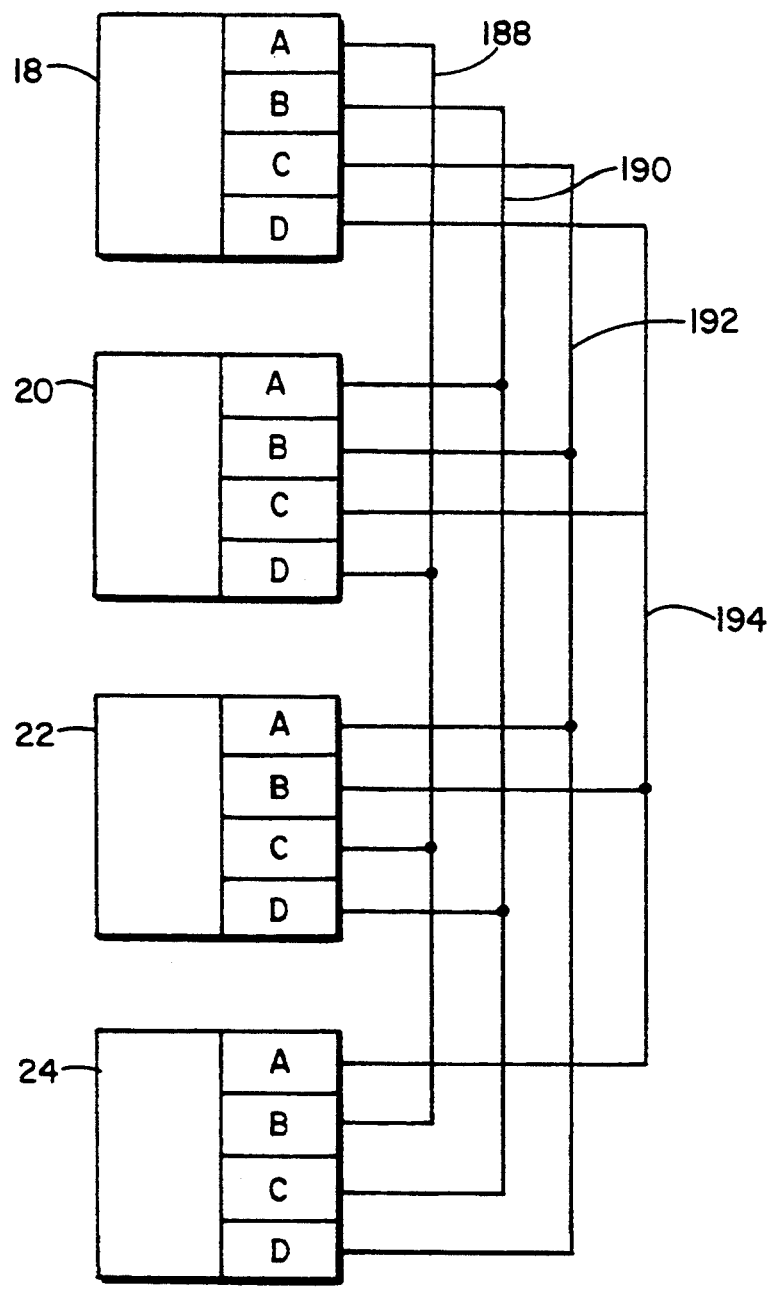
FIG. 5 is a schematic view of a data bus interconnection of the processing devices.

The logic in registers Mp A-D, LK A-D and MSD A-D is identical for all of the processing devices. However, the logic in register Mp A is different in each one of the processing devices. Likewise, the contents of each of the registers Mp B, Mp C and Mp D differ from one processing device to another. The reason is apparent from FIG. 5, illustrating the arbitration linkage of the processing devices. Processing devices 20, 22 and 24, in their respective arbitration sectors, include respective registers Mp A, LK A and MSD A, all indicated at A. Likewise, respective Mp, LK and MSD registers B-D are indicated at B, C and D, respectively.

Processors 20–24 also include respective bus monitor registers, configuration registers and tie break registers, not illustrated in this figure.

Each of the Mp A registers is an output register for its associated processing device, and provides its contents to one of four ten-bit data buses 188, 190, 192 and 194. Thus, each of data buses virtually instantaneously transmits the logic from its associated register Mp A to one of the input registers (Mp B-D) in each of the other processing devices. Further, these buses connect the processing devices in a sequential or round robin manner, whereby all four processing devices have the same status. Each data bus is associated with one of the processing devices. For example, data bus 188 is associated with processing device 18 in that it receives the output of Mp A register 152, and provides its output to the Mp D register of device 20, the Mp C of device 22 and the Mp B register of device 24. Each of the remaining data buses 190–194 connects the processing devices in the same fashion, the only difference being the processing device from which each bus receives the Mp A register output.

Figure 6:
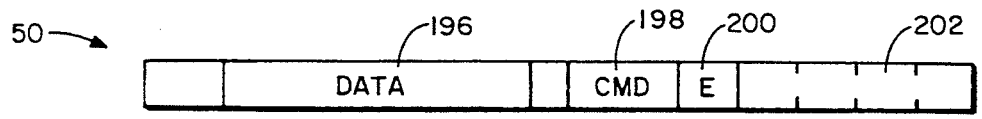
FIG. 6 is a representation of a processing intercommunications register of one of the processing devices.

Processor intercommunications registers 50, 94, 96 and 98 enable the processing devices to communicate with one another via interface 26. As seen in FIG. 6, PIR register 50 of processing device 18 includes a data field 196, a command field 198, an exception or interrupt field 200 and a processor identity field 202. Processor intercommunications registers 94, 96 and 98 are substantially identical to PIR 50.

When sending a PIR message, a processor sets the appropriate identification bits for the intended receiving processors, writes a command with the bit in exception field 200 set, and writes the appropriate data to data field 196. This raises an MP exception on each of the processing devices whose identification bit is set. To acknowledge the command, each receiving processor must reset its identification bit by writing it to the identification field with the exception bit reset. So long as any of the receiving processing devices has not acknowledged the command by resetting its identification bit, the processor intercommunications registers are considered "busy", i.e. not available for further message transmissions.

Data field 196 is sufficiently large to accommodate a virtual address segment, which allows use of the processor intercommunications registers to send a virtual address segment to be purged from the look-aside buffers of all processing devices.

Updates to the processing intercommunications registers that write the command and identification bits are protected by a PIR hardware lock. The lock need not be held while a processor awaits message acknowledgement, since the processor intercommunications registers remain busy while messages are pending. This allows asynchronous purges of the look-aside buffers in connection with HMC instructions requiring resetting the primary directory reference bit. In view of the frequent use of the PIR to reset reference bits in the primary directory, the asynchronous look-aside buffer purge is a significant performance advantage.

Figure 7:
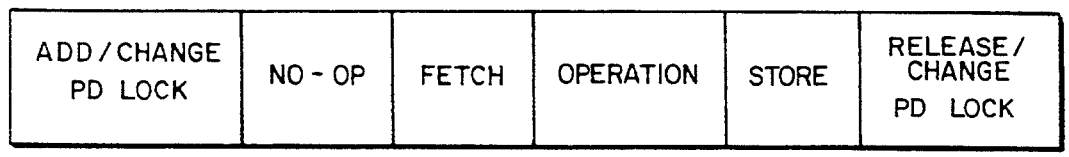
FIG. 7 is a general timing diagram of a primary directory operation performed by the processing devices utilizing a primary directory hardware lock.

FIG. 7 illustrates an operation on primary mapping data utilizing the primary directory hardware lock. Before performing the operation, one of processors 18–24 gains control of the primary directory lock, either through an ADD command or CHANGE command. A single clock cycle delay or "no-op" follows the setting of the primary directory lock. Following the delay, the processor fetches the primary directory mapping data. Once it has acquired the data, the processing device performs the desired operation upon the data in accordance with one or more HMC instructions or control words. Upon completion of the operation, the processing device stores the mapping data back to the primary directory. The processing device relinquishes control the primary directory lock, either by a RELEASE command or a CHANGE command. None of the other processing devices is able to gain access to the primary directory for fetching the primary mapping data without gaining control of the primary directory lock, and none of the other devices can acquire the primary directory lock until its release by the processing device currently in control. Further, so long as any of the processing devices controls the primary directory lock, none of the processing devices can gain access to interface 26 to perform a hardware search or address translation in the primary directory.

Figure 8:
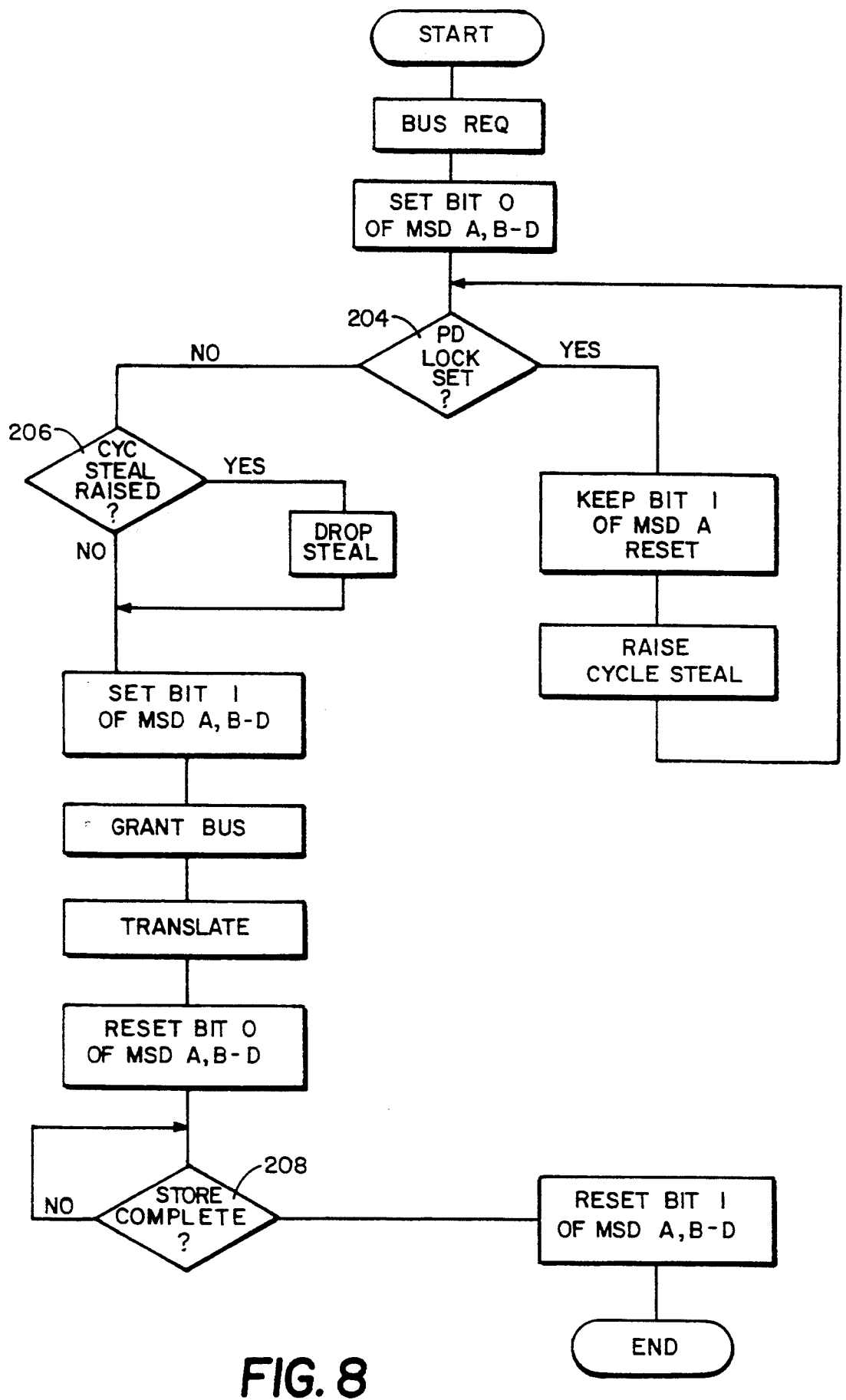
FIG. 8 is flow chart illustrating a primary directory operation initiated by primary directory translate logic in one of the processing devices.
Figure 9:
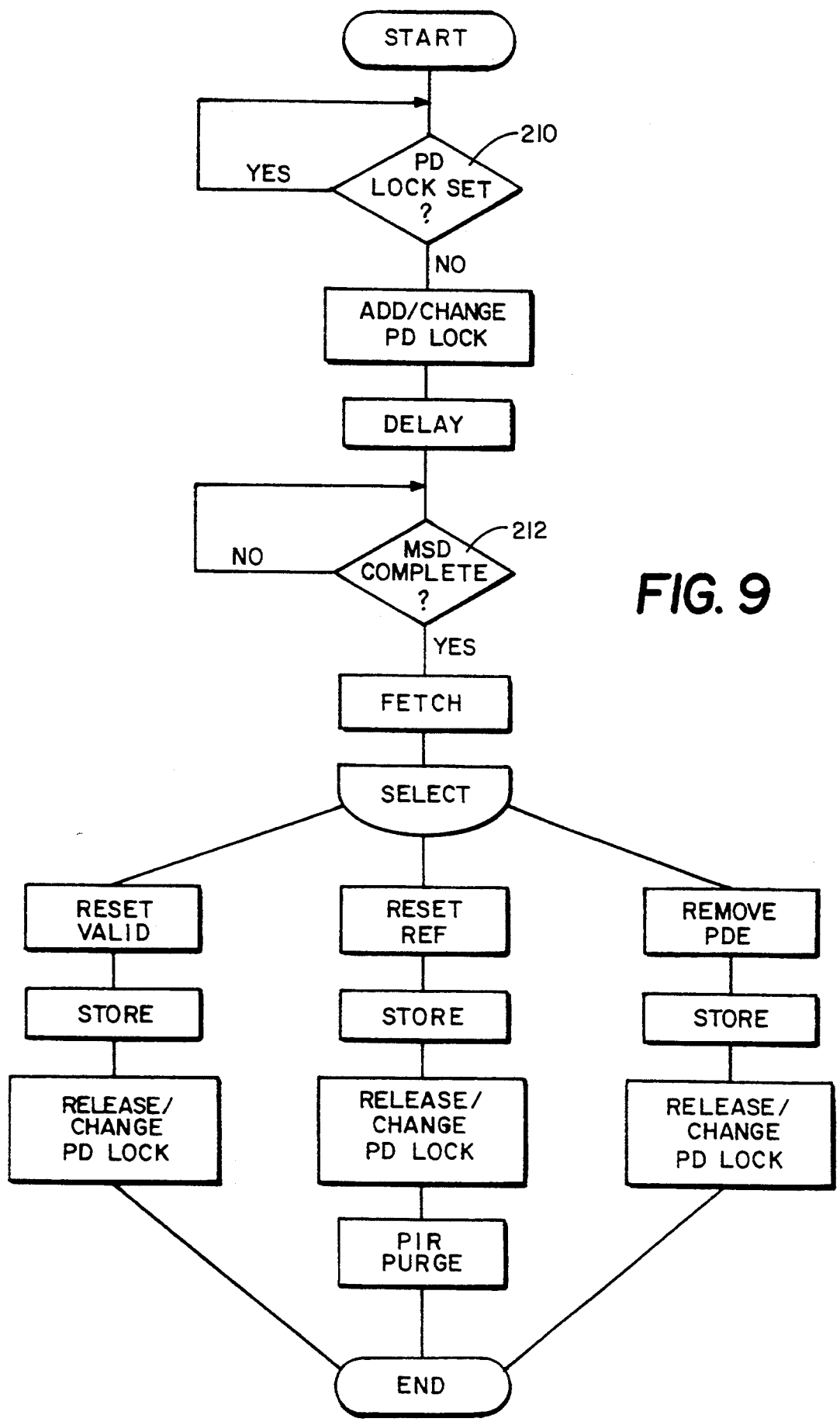
FIG. 9 is flow chart illustrating a primary directory operation initiated by one of the processing devices acquiring control of the primary directory hardware lock.

For a better understanding of how HMC primary directory operations and hardware initiated primary directory translations are serialized, it is appropriate to consider the flow charts in FIGS. 8 and 9 relating to a hardware primary directory search and an HMC primary directory operation, respectively.

Hardware primary directory searches are initiated when a virtual address can not be translated through the look-aside buffer, e.g. buffer 42 in processing device 18. This event triggers a request for access to interface 26, reflected in Mp A register 152 by a binary "11" in bit positions 0 and 1 of the register. By virtue of bus 188, bit positions of the related input registers (i.e. Mp B-D of processing devices 24, 22 and 20, respectively) also are set. This also sets the first bit position of MSD A register 174. If one of the processing devices holds the primary directory hardware lock at 204 (PD lock set = true), access to interface 26 is denied. Bit position 1 of register 174 remains at 0. Also, a cycle steal is raised or made active, to prevent any subsequent processor fetch or store operations from gaining interface 26 ahead of the hardware primary directory search request. The indication of "PD lock set" is provided by register 166, i.e. lock register A of processing device 18, by virtue of the binary one at lock position 7 of this register. Corresponding lock registers in the other processing devices, in particular lock register D in processing device 24, lock register C in processor 22 and lock register B in processor 20, likewise exhibit the binary one at lock position 7. Thus, the indication that the primary directory lock is set, is provided in each processing device.

If the primary directory lock is not set, or when a processing device holding the lock releases the lock, bit position one of hardware translate register A of processor 18, (i.e. register 174) is set. Any previously raised cycle steal (at 206) is dropped. The corresponding hardware translate registers in the other processors, coupled to register 174 by arbitration bus 188, likewise are set at bit position 1. Processing device 18 is granted control of interface 26, and can perform a translation using primary directory 124. At this point, any of the processing devices, including device 18, can acquire the primary directory hardware lock. Such acquiring processor, however, is inhibited from fetching any data in the primary directory until the address translation is complete.

Upon completing the translation, processing device 18 through its translate logic 44 drives the bus request line of its Mp A register (register 152) to a binary one, for a single cycle. This resets bit position 0 of hardware translate register 174 (MSD A), and likewise resets the corresponding hardware translate registers B, C and D in the other processing devices. If the primary directory translation involves a store, the store is tracked as indicated at 208 until it is complete. For further information on the sequencers that track store operations, reference is made again to the aforementioned application Ser. No. 07/581,843 abandoned and continued as Ser. No. 07/962,625.

Once the store is complete, bit position 1 of hardware translate register 174 is reset. This bit position is likewise reset in the corresponding hardware translate registers of processing devices 20-24. Now, with both bit positions in the hardware translate register reset, a processing device having earlier acquired the primary directory lock is enabled to proceed.

It should be emphasized that the address translation by processing device 18 does not delay or otherwise interfere with hardware address translations initiated in the translation logic of the other processing devices. The only accesses to the primary directory inhibited by processing device 18 are accesses governed by the horizontal microcode, i.e. involving the primary directory lock. Thus, while only one primary directory update is permitted to proceed under the HMC, two or more hardware initiated address translations can proceed simultaneously.

As seen in FIG. 9, an HMC primary directory update begins with a query at 210 as to whether a processor holds the PD lock. If not, a processor acquires control of the primary directory lock, either with an ADD or a CHANGE command. For processing device 18, the command and the identification of the primary directory lock are indicated in the lock and command field of Mp A register 152, and the same field in the corresponding Mp B-D registers of the other processors. Control of the primary directory lock is indicated by a binary one in lock position 7 of lock A register 166 and in the corresponding registers. Lock acquisition triggers a one clock cycle delay, followed by a query at 212 as to whether all hardware address translations are complete. Address translations in progress do not inhibit a processor from acquiring the primary directory lock. However, as indicated at 212, the processing device controlling the lock is inhibited from access to the primary directory as long as any hardware address translations are in progress. Lock acquisition does, however, deny interface 26 to any hardware address translations initiated after lock acquisition.

When pending hardware address translations are complete, as indicated by a reset of bit one in all of the hardware translate registers, the HMC operation can fetch one of the primary directory entries. At this point the desired update to the primary directory is performed, for example a reset of the VALID bit, a reset of the REFERENCE bit, or a removal of the primary directory entry from the PDE chain. In each case a store completes the operation, and is followed with a release of the primary directory lock, indicated by resetting bit position 7 in the appropriate lock registers. At this point, any hardware address translations initiated after lock acquisition, and thus previously denied access to interface 26, are able to gain control of the interface, subject to interface arbitration among the processors.

If the update involved resetting the REFERENCE bit in the primary directory entry, the processing device controlling the hardware lock purges the virtual address in its look-aside buffer, and sends a message to the other processors via the processor intercommunications registers, to purge the virtual address if present in their look-aside buffers.

The primary directory lock provides HMC with a means for updating primary directory status bits atomically with respect to hardware primary directory translations. PDE chain fields can be updated during times when no hardware address translations are in progress. In accordance with the present invention, hardware address translations in the primary directory are inhibited during primary directory updates. No quiesces are involved. Consequently, during updates the processing devices are free to perform operations on data that do not require access to the primary directory. Avoiding quiesces substantially improves network performance, particularly where a relatively small data page size is employed. The delay of address translations also prevents unnecessary purges of the look-aside buffers, as it guarantees that a status bit indication of "no need to purge" at the beginning of a primary directory update is preserved throughout the update.

What is claimed is:

1. In a data processing network including a plurality of processing devices for executing computer program instructions to manipulate bit-encoded data, a main storage memory shared by the processing devices and having a plurality of page frames for storing bit-encoded data, an auxiliary storage means shared by the processing devices for storing bit-encoded data, and an interface connected to the processing devices, to the main storage memory and to the auxiliary storage means for transmitting bit-encoded data among the processing devices, the main storage memory and the auxiliary storage facility; and wherein the main storage memory includes a primary directory containing primary mapping information for associating real addresses of the page frames with virtual addresses corresponding to data storage locations in the auxiliary storage means;

a system for resolving contentions among the processing devices for the primary mapping information, the system including:

a primary directory lock, a plurality of control store means, one in each of the processing devices, containing computer program instructions including control words for requesting the primary directory lock and for acquiring the primary directory lock as a condition precedent to performing data operations on the primary mapping information;

wherein each processing device includes a hardware address translate means for requesting control of the interface for access to the primary directory to perform address translations on the primary mapping information without acquiring the primary directory lock, and a secondary directory containing secondary mapping information including a portion of the primary mapping information;

a first signalling means for generating a lock-acquired signal when one of the processing devices acquires control of the primary directory lock and continues to hold the primary directory lock and for generating a lock-released signal when said one of the processing devices completes a data operation on the mapping information and releases the primary directory lock;

a second signalling means for generating an interface-requested signal when the hardware translate means of one of the processing devices requests control of the interface and for generating an interface-acquired signal when the hardware translate means gains control of the interface;

a transmission means for: (i) transmitting the lock-acquired signal to the other ones of the processing devices, thereby preventing the other processing devices from acquiring control of the primary directory lock as long as the other processing devices continue to receive the lock-acquired signal; (ii) providing the lock-released signal to the other processing devices, to enable the other processing devices to acquire control of the primary directory lock; and (iii) providing the interface-requested and interface-acquired signals to all of the other processing devices;

wherein each processing device, responsive to receiving the interface-requested signal, is inhibited from gaining access to the primary directory via the primary directory lock until it no longer receives either the interfaced-requested signal or the interface-acquired signal; and wherein the lock-acquired signal inhibits the hardware translate means of each of the processing devices from gaining control of the interface until the processing device receives the lock-released signal.

2. In the data processing network of claim 1 wherein:
each of the processing devices includes a set of hardware translate registers, one of the translate registers in each set corresponding to a different one of the processing devices, and wherein the means for generating the interface-requested and interface-acquired signals include first and second bit positions in each of the translate registers; a binary one in a first bit position of one of the translate registers indicating that the corresponding processing device is requesting control of the interface, and a binary one in the second bit position of said one translate register indicating that the corresponding processing device has gained control of the interface.

3. In the data processing network of claim 2, wherein:
each of the processing devices includes a set of lock registers, one of the lock registers in each set corresponding to each one of the processing devices, each of the lock registers having a selected bit position corresponding to the primary directory lock; a binary one in the selected bit position of one of the lock registers indicating that the processing device corresponding to the one lock register has acquired the primary directory lock.

4. In the data processing network of claim 1 wherein:
said transmission means includes a plurality of data buses equal to the number of processing devices, and wherein each of the data buses is associated with one of the processing devices, each data bus being connected to its associated processing device and to each of the remaining processing devices to provide logic of its associated processing device as an input to each of the remaining processing devices.

5. An information processing network including a plurality of processing devices for executing computer program instructions to manipulate bit-encoded data, a main storage memory shared by the processing devices and having a plurality of page frames for storing bit-encoded data, an auxiliary storage means shared by the processing devices for storing bit-encoded data, and an interface connected to the processing devices, to the main storage memory and to the auxiliary storage means for transmitting bit-encoded data among the processing devices, the main store memory and the auxiliary storage facility;

said main storage memory including a primary directory containing primary mapping information for associating real addresses of the page frames with virtual addresses corresponding to data storage locations in the auxiliary storage means;

each of the processing devices including: a secondary directory containing secondary mapping information comprising a portion of the primary mapping information; a primary directory translator means for performing data translations on the secondary mapping information, and for requesting access to the primary mapping information via the interface and for performing translations on the primary mapping information upon gaining said access; and a first signalling means for generating a first signal when the associated processing device requests said access and for generating a second signal when the associated processing device gains said access;

a signal transmission means for providing the first and second signals to the other ones of the processing devices;

a protection means for preventing the primary directory translator means of any of the processing devices from gaining access to the primary directory during predetermined times, said protection means including: a primary directory lock; a control store means in each one of the processing devices, containing computer program instructions including control words for performing data operations on the primary mapping information, and for acquiring the primary directory lock as a condition precedent to gaining access to the primary mapping information; and a second signalling means in each said processing device for generating a lock-acquired signal when the associated processing device acquires control of the primary directory lock, and for generating a lock-released signal when said one of the processing devices releases the primary directory lock after performing a data operation on the primary mapping information;

said transmission means providing the lock-acquired signal to the other ones of the processing devices, thereby preventing any of the other directory lock and further preventing any of the primary directory translator means from gaining said access; wherein each processing device includes a set of hardware translate registers, one hardware translate register in each set associated with each one of the processing devices; and wherein the first signalling means includes first and second bit positions of the hardware translate registers, a binary one in the first bit position of one of the translate registers indicating that the processing device corresponding to the one hardware translate register is requesting said access, and a binary one in the second bit position of the one hardware translate register indicating that said corresponding processing device has gained said access.

6. The information processing network of claim 5 wherein:

said second signalling means includes a set of lock registers in each of the processing devices, one of the lock registers in each set corresponding to each one of the processing devices; and wherein a selected bit position in each of the lock registers corresponds to the primary directory lock, a binary one in the selected bit position of one of the lock registers indicating that the processing device associated with the one lock register has acquired the primary directory lock.

7. The information processing network of claim 5 wherein:

said transmission means includes a plurality of data buses equal to the number of processing devices, each of the data buses being associated with one of the processing devices, each of the data buses being connected to its associated processing device and to each of the remaining processing devices, to provide logic of its associated processing device as an input to each of the remaining processing devices.

8. An information processing network including a plurality of processing devices for executing computer program instructions to manipulate bit-encoded data, a main storage memory shared by the processing devices and having a plurality of page frames for storing bit-encoded data, an auxiliary storage means shared by the processing devices for storing bit-encoded data, and an interface connected to the processing devices, to the main storage memory and to the auxiliary storage means for transmitting bit-encoded data among the processing devices, the main store memory and the auxiliary storage facility;

said main storage memory including a primary directory containing primary mapping information for associating real addresses of the page frames with virtual addresses corresponding to data storage locations in the auxiliary storage means;

each of the processing devices including: a secondary directory containing secondary mapping information comprising a portion of the primary mapping information; a primary directory translator means for performing data translations on the secondary mapping information, and for requesting access to the primary mapping information via the interface and for performing translations on the primary mapping information upon gaining said access; and a first signalling means for generating said a first signal when the associated processing device requests said access and for generating a second signal when the associated processing device gains said access;

a signal transmission means for providing the first and second signals to the other ones of the processing devices, said signed transmission means including a plurality of data buses equal to the number of processing devices, each of the data buses being associated with one of the processing devices, each of the data buses being connected to its associated processing device and to each of the remaining processing devices, to provide logic of its associated processing device as an input to each of the remaining processing devices; and a protection means for preventing the primary directory translator means of any of the processing devices from gaining access to the primary directory during predetermined times, said protection means including: a primary directory lock; a control store means in each one of the processing devices, containing computer program instructions including control words for performing data operations on the primary mapping information, and for acquiring the primary directory lock as a condition precedent to gaining access to the primary mapping information; and a second signalling means in each said processing device for generating a lock-acquired signal when the associated processing device acquires control of the primary directory lock, and for generating a lock-released signal when said one of the processing devices releases the primary directory lock after performing a data operation on the primary mapping information;

said transmission means providing the lock-acquired signal to the other ones of the processing devices, thereby preventing any of the other processing devices from acquiring control of the primary directory lock and further preventing any of the primary directory translator means from gaining said access.

9. The information processing network of claim 8 wherein:

each processing device includes a set of hardware translate registers, one hardware translate register in each set associated with each one of the processing devices; and wherein the first signalling means includes first and second bit positions of the hardware translate registers, a binary one in the first bit position of one of the translate registers indicating that the processing device corresponding to the one hardware translate register is requesting said access, and a binary one in the second bit position of the one hardware translate register indicating that said corresponding processing device has gained said access.

10. The information processing network of claim 9 wherein:

said second signalling means includes a set of lock registers in each of the processing devices, one of the lock registers in each set corresponding to each one of the processing devices; and wherein a selected bit position in each of the lock registers corresponds to the primary directory lock, a binary one in the selected bit position of one of the lock registers indicating that the processing device associated with the one lock register has acquired the primary directory lock.

11. In an information processing network including a plurality of processing devices for executing computer program instructions to manipulate bit-encoded data, a main storage memory shared by the processing devices an having a plurality of page frames for storing bit-encoded data, an auxiliary storage means shared by the processing devices for storing bit-encoded data, and an interface connected to the processing devices, the main storage memory and the auxiliary storage means for transmitting bit-encoded data among the processing devices, main storage memory and auxiliary storage means;

said main storage memory including a primary directory containing primary mapping information for associating real addresses of the page frames with virtual addresses corresponding to data storage locations in the auxiliary storage means; each of the processing devices including a secondary directory containing secondary mapping information including a portion of the primary mapping information, a primary directory translation means for performing translations on the secondary mapping information and for requesting access to the primary mapping information via the interface and for gaining said access to perform translations on the primary mapping data, and a first signalling means for generating a first signal when the associated processing device requests said access and a second signal when the associated processing device gains said access; and a signal transmitting means for providing the first and second signals to all of the processing devices other than the one processing device:

a process for temporarily inhibiting the primary directory translation means of all said processing devices from gaining said access, including the steps of:

denying said access in response to all requests for said access subsequent to a selected point in time while permitting a completion of pending translations corresponding to requests made prior to the selected point in time;

after the completion of said pending translations, fetching primary mapping information into one of the processing devices, performing a data operation on the primary mapping data fetched, then storing the primary mapping data back to the primary directory upon completing the data operation, all while continuing to deny requests by any of the primary directory translation means for said access; and following the storing of the primary mapping data, granting said access to a next one of the primary directory translation means requesting said access.

12. The process of claim 11 wherein:

said step of denying said access includes acquiring a primary directory lock, generating a lock-acquired signal and transmitting the lock-acquired signal to all of the other processing devices at said selected point in time; and wherein the step of permitting the completion of pending translations includes keeping the primary directory lock, once acquired, in an inhibit condition until the pending translations are complete.

13. The process of claim 12 wherein:

said step of performing the data operation includes at least one of the following: (i) resetting a valid bit in the primary mapping information corresponding to one of the page frames; (ii) resetting a reference bit in a portion of the primary mapping information corresponding to said one page frame, and (iii) removing primary mapping information from the primary directory.

14. The process of claim 13 further including:

the step of purging the secondary mapping information associated with said one page frame whenever the data operation includes resetting the reference bit corresponding to the one page frame.

* * * * *

UNITED STATES PATENT AND TRADEMARK OFFICE
CERTIFICATE OF CORRECTION

PATENT NO. : 5,339,397
DATED : August 16, 1994
INVENTOR(S) : Richard G. Eikill et al It is certified that error appears in the above-indentified patent and that said Letters Patent is hereby corrected as shown below:

Claim 5 in column 15 at line 51 after "other" insert -- processing devices from acquiring control of the primary --;

Claim 11 in column 18 at line 1 after "each" insert -- one --.

Signed and Sealed this

Twenty-fifth Day of October, 1994

Attest:

BRUCE LEHMAN

Attesting Officer     Commissioner of Patents and Trademarks